United States Patent
Suzuki et al.

[11] Patent Number: 6,146,300
[45] Date of Patent: Nov. 14, 2000

[54] TENSIONER DEVICE FOR CHAIN DRIVE MECHANISM

[75] Inventors: Tadasu Suzuki, Tokyo-to; Katsuya Nakakubo; Shigekazu Fukuda, both of Saitama-ken, all of Japan

[73] Assignee: Tsubakimoto Chain Co., Osaka, Japan

[21] Appl. No.: 09/300,996

[22] Filed: Apr. 28, 1999

[30] Foreign Application Priority Data

Apr. 30, 1998 [JP] Japan .................................. 10-120954

[51] Int. Cl.⁷ ..................................................... F16H 7/00
[52] U.S. Cl. ........................ 474/111; 474/110; 474/109; 474/138
[58] Field of Search .................................... 474/101, 110, 474/109, 113–115, 133, 135, 136, 138, 140

[56] References Cited

U.S. PATENT DOCUMENTS

| | | | |
|---|---|---|---|
| 3,252,347 | 5/1966 | Seaman . | |
| 4,863,417 | 9/1989 | Kimata . | |
| 4,874,352 | 10/1989 | Suzuki | 474/111 X |
| 5,366,418 | 11/1994 | Fukushima et al. | 474/111 |
| 5,713,809 | 2/1998 | Yamamoto et al. | 474/110 |
| 5,720,684 | 2/1998 | Mott | 474/111 X |
| 5,931,754 | 8/1999 | Stief et al. | 474/111 X |

FOREIGN PATENT DOCUMENTS

| | | |
|---|---|---|
| 1550752 | 10/1969 | Germany . |
| 40 17 630 | 6/1995 | Germany . |
| 196 46 488 | 5/1997 | Germany . |
| 2209576 | 5/1989 | United Kingdom . |

*Primary Examiner*—David A. Bucci
*Assistant Examiner*—Marcus Charles
*Attorney, Agent, or Firm*—Dann, Dorfman, Herrell and Skillman; Henry H. Skillman

[57] ABSTRACT

A tensioner device for adjusting a tension in a chain wound around two sprockets includes a tensioner lever held in sliding contact with a slack run of the chain, an oil-filled tensioner provided on a stationary member, and a ratchet tensioner provided on the tensioner lever. The oil-filled tensioner includes a piston movable back and forth relatively to a housing attached to the stationary member, and a spring urging the piston in the forward direction. The ratchet tensioner includes a plunger movable in the forward direction relative to a housing formed integrally with the tensioner lever, and a spring urging the plunger in the forward direction. The piston and the plunger are held in face-to-face abutment with each other. The spring of the oil-filled tensioner has a larger spring coefficient than the spring of the ratchet tensioner. With this construction, when a sag of the chain is in excess of the forward stroke of the piston of the oil-filled tensioner, the plunger of the ratchet tensioner moves forward to cover a shortage of forward stroke of the piston. The tensioner device can continue proper tension-adjusting operation over a long period of use of a chain drive mechanism in which it is incorporated.

5 Claims, 5 Drawing Sheets

TENSIONER DEVICE FOR CHAIN DRIVE MECHANISM

BACKGROUND OF THE INVENTION

1. Field of the Invention:

The present invention relates to a tensioner device for use in a chain drive mechanism to apply a proper tension to a chain of the chain drive mechanism.

2. Description of the Related Art:

Tensioner devices are used to exert a predetermined tension on a chain, a belt or a like power transmitting means. A typical example of the known tensioner devices is a ratchet tensioner device which is generally used in combination with a camshaft drive chain of a vehicle engine. The ratchet tensioner device includes a plunger slidably received in a housing. In order to apply a predetermined tension to the chain, the plunger partly projects from the housing. The plunger received in the housing defines jointly with the housing an oil chamber in which oil is supplied at a predetermined pressure while the engine is running. A ratchet mounted to the housing is held in mesh with ratchet teeth formed on an outer peripheral surface of the plunger along an axis thereof, so that retracting or backward movement of the plunger is prevented.

Another example of known tensioner devices is an oil-filled tensioner device which is particularly suitable for use with a belt having a small elongation. The oil-filled tensioner device includes a piston slidably received in a housing such that a high-pressure chamber and a low-pressure chamber separated by the piston are formed within the housing. The high-pressure chamber and the low-pressure chamber are filled with oil. In one direction from the low-pressure chamber to the high-pressure chamber, the oil can flow without substantive restriction. In the opposite direction from the high-pressure chamber to the low-pressure chamber, only a restricted flow of oil is permitted. The piston is urged by a spring in a direction to project from the housing.

In the ratchet tensioner device, the ratchet permits forward (advancing) movement of the plunger while preventing backward (retracting) movement of the plunger. The ratchet has a certain degree of backlash as it is held in mesh with the ratchet teeth on the plunger. The backlash must be kept small, or the chain tends to cause whipping. However, extremely small backlash hinders sufficient absorption of an increase in chain tension by the tensioner device. Thus, the ratchet tensioner device has a relatively low response to a change in the chain tension.

The oil-filled tensioner device has an excellent response to an increase and a decrease of the chain tension, but the stroke of the piston is relatively small. When used with a power transmission mechanism including a chain the elongation of which increases with time, the oil-filled tensioner device is made large in size to secure a large piston stroke and hence requires large space for installation thereof.

SUMMARY OF THE INVENTION

It is accordingly an object of the present invention to provide a tensioner device which can quickly and smoothly accommodate elongation of a chain, has a large stroke, and is capable of continuously respond to variations in chain tension.

To attain the foregoing object, the present invention provides a tensioner device for a chain drive mechanism including at least two sprockets spaced from each other on a stationary member, and an endless chain wound around the sprockets. The tensioner device comprises a tensioner lever having one end pivoted to the stationary member, said tensioner lever being in slide contact with the chain between the sprockets to adjust a tension in the chain. The tensioner device further includes a first tensioner assembly having a first housing, a plunger movable in a forward direction relative to said first housing, a spring urging said plunger toward the forward direction, and a stop means for preventing backward movement of said plunger. A second tensioner assembly of the tensioner device includes a second housing, a piston movable in a forward and a backward direction relative to said second housing, a spring urging said piston toward the forward direction, and means for restricting backward movement of said piston while allowing forward movement of said piston. One of said first and second tensioner assemblies is provided on said trensioner lever, and the other tensioner assembly is provided on the stationary member. The plunger and said piston are being in face-to-face abutment with each other. The spring of said first tensioner assembly has a spring coefficient smaller than a spring coefficient of the spring of said second tensioner assembly.

With this arrangement, when a sag of the chain is in excess of the forward stroke of the piston of the second tensioner assembly, the plunger of the first tensioner assembly moves forward to cover a shortage of forward stroke of the piston, thereby enabling the second tensioner assembly to further continue its prescribed tension-adjusting operation.

The first tensioner assembly includes a stop means or mechanism for preventing backward movement of the plunger. The stop mechanism may be a ratchet mechanism composed of a row of ratchet teeth on an outer peripheral surface of the plunger, and a ratchet pawl pivotally mounted to the first housing and held in mesh with one of the ratchet teeth. As an alternative, the stop mechanism may be a screw stop mechanism composed of an externally threaded body portion of the plunger and an internally threaded hole of a nut member attached to an open end of the first housing. The externally threaded plunger body is threaded into the internally threaded hole. Threads of the plunger body and the nut member have a sawtooth form so designed to prevent backward movement of the plunger while allowing forward movement of the plunger. Alternatively, the stop mechanism may include a conical surface formed at an open end of the first housing, and a plurality of spring-biased balls urged to wedge into an annular space defined between the conical surface and an outer peripheral surface of the plunger. The spring-biased balls prevent backward movement of the plunger while allowing forward movement of the plunger.

The above and other features and advantages of the present invention will become manifest to these versed in the art upon making reference to the detailed description and the accompanying sheets of drawings in which preferred structural embodiments incorporating the principles of the invention are shown by way of illustrative examples.

DETAILED DESCRIPTION OF THE PREFERRED EMBODIMENTS

Certain preferred embodiments of the present invention will be described in greater detail with reference to the accompanying drawings.

Figure 1:
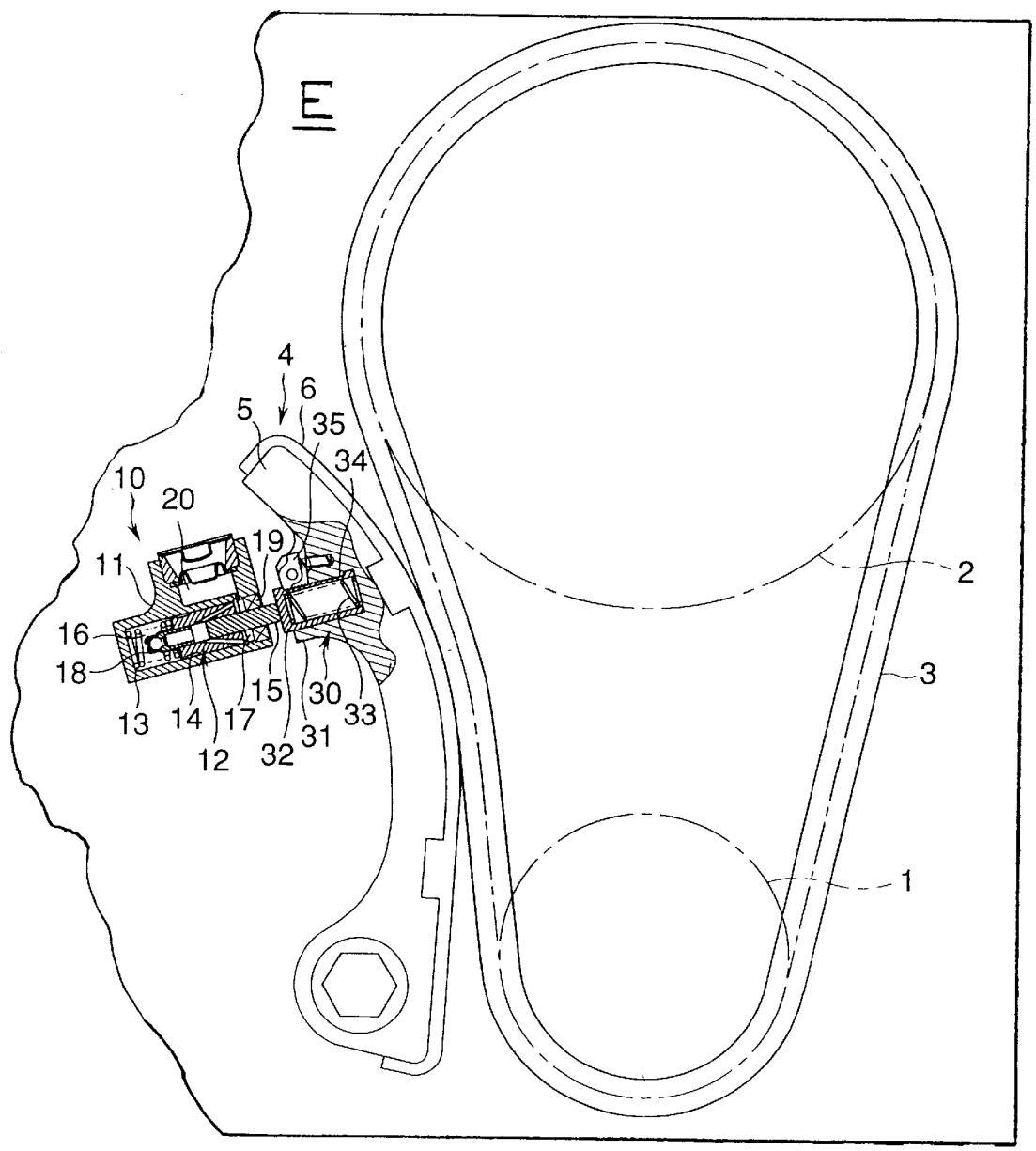
FIG. 1 is a front elevational view, with parts cutaway for clarity, of a tensioner device according to a first embodiment of the present invention.

Referring now to FIG. 1, there is shown a chain drive mechanism in which a tensioner device according to a first embodiment of the present invention is incorporated.

As shown in FIG. 1, the chain drive mechanism includes a crank sprocket 1 firmly connected to a crankshaft (not shown) of a vehicle engine (not shown), and a cam sprocket 2 firmly connected to a camshaft (not shown) of the vehicle engine, and an endless timing chain 3 wound around the crank sprocket 1 and the cam sprocket 2. As is well known, the crankshaft and the cam shaft are rotatably mounted on an engine block shown diagrammatically at E in FIG. 1 which forms a stationary member E of the vehicle engine. The crank sprocket 1 is a drive sprocket, and the cam sprocket 2 is a driven sprocket. The timing chain 3 extending between the crank sprocket 1 and the cam sprocket 2 has a tension run on one side (called "tension side" shown on the right-hand side in FIG. 1) of the crank (drive) sprocket 1 and a slack run on the other side (called "slack side" shown on the left-hand side in FIG. 1) of the crank sprocket 1.

The tensioner device of the present invention includes a tensioner lever 4 which is in contact with the slack run of the timing chain 3 from an outer side of the timing chain 3. The tensioner lever 4 includes an elongate base 5 pivotally connected at one end to the stationary member (engine block), and a shoe 6 attached to a surface of the base 5 facing the timing chain 3. The base 5 is made of metal, and the shoe 6 is made from a synthetic resin. The timing chain 3 slidably engages a surface of the shoe 6. The tensioner lever 4 pivotally moves about its fixed or pivoted one end, so that a tension in the timing chain 3 can be adjusted. The drive sprocket may be formed by the cam sprocket 2.

The tensioner device further includes two tensioner assemblies 10 and 30. One tensioner assembly 10 is an oil-filled tensioner provided on the stationary member (engine block), and the other tensioner assembly 30 is a ratchet tensioner provided on the tensioner lever 5. As will be described later, the oil-filled tensioner is of the retractable type while the ratchet tensioner 30 is of the advancing type.

Figure 1A:
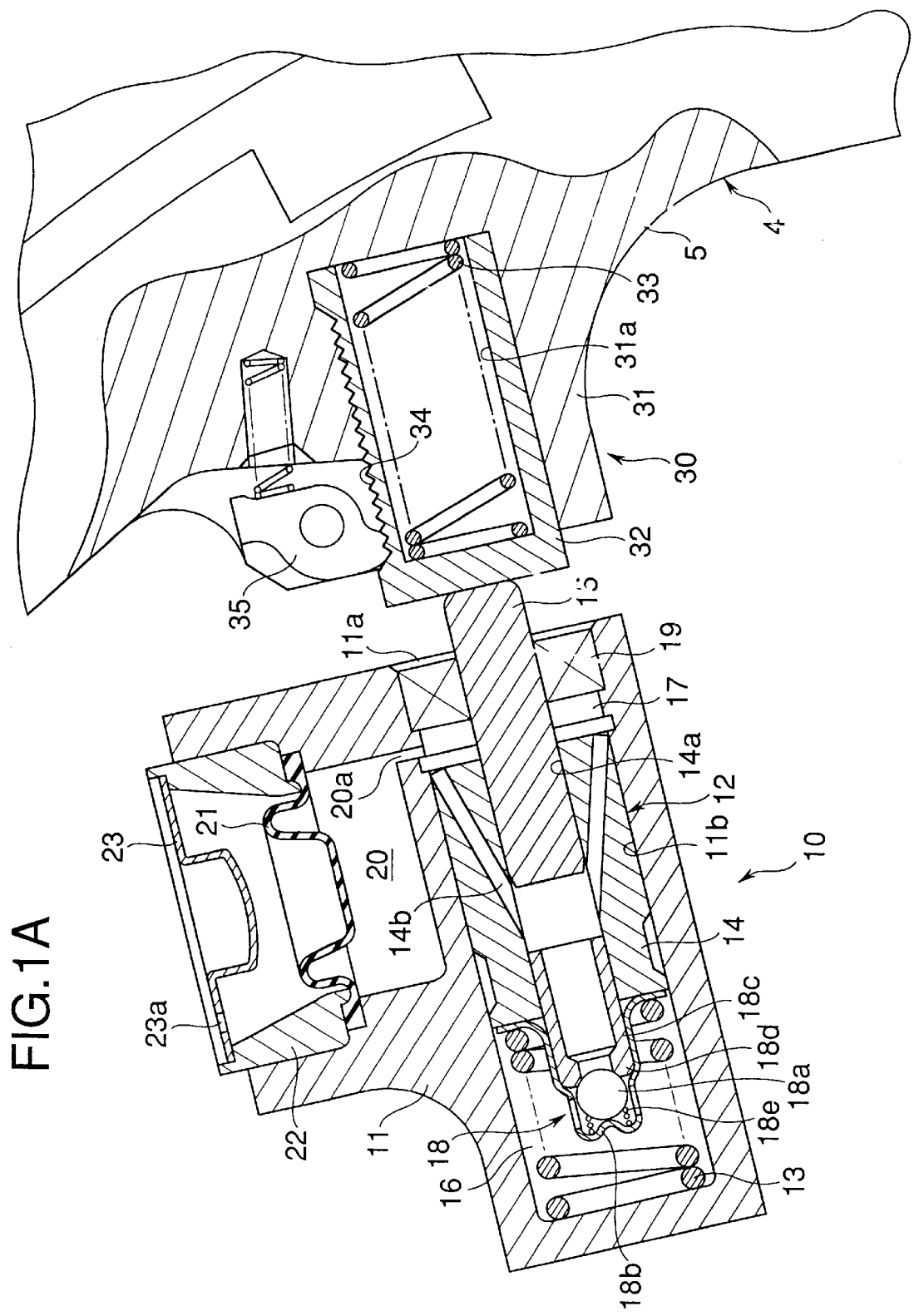
FIG. 1A is an enlarged view of a portion of the tensioner device shown in FIG. 1.

As better shown in FIG. 1A, the oil-filled tensioner 10 includes a housing 11 having an opening 11a at an end thereof, a piston 12 slidably received in a cylindrical piston bore 11b formed inside the housing 11, and a compression coil spring 13 received in the piston bore 11b and acting between the housing 11 and the piston 12 to urge the piston 12 in a direction projecting from the piston bore 11b through the opening 12a to the outside of the housing 11. The piston 12 is composed of a hollow cylindrical piston block 14 and a solid cylindrical piston rod 15 press-fitted in an axial central hole 14a of the piston block 14 along an outer end portion of the piston block 14. The piston 12 received in the piston bore 11b divides an internal space of the piston bore 11b into a high-pressure chamber 16 defined between a closed end of the housing 11 and the piston block 14, and a low-pressure chamber 17 defined between the piston block 14 and the open end 11a of the housing 11 which is closed by an oil seal 19 fitted around the piston rod 15 at the housing open end 11a. The low pressure chamber 17 communicates with an oil reservoir 20 through a connecting passage 20a. The oil reservoir 20 is closed by a diaphragm seal 21 of rubber attached to the housing 11 by an annular end plug 22. The oil reservoir 20 and the high- and low-pressure chambers 16, 17 are filled with oil. An outer end of the end plug 22 is closed by a cover plate 23. The cover plate 23 has a vent hole 23a so that an outer side of the rubber diaphragm seal 21 is subjected to the atmospheric pressure. The diaphragm seal 21 is deformable to accommodate volumetric changes of the oil held inside the oil-filled tensioner 10.

The piston block 14 has a plurality of oil passages holes 14b extending diagonally from an outer end face toward the inner end of the piston block 14 and opening to the axial central hole 14a of the piston block 14. The oil passage holes 14b are connected at one end to the low pressure chamber 17 and communicate with the high-pressure chamber 16 when a check valve 18 associated with the piston 12 is open.

The check valve 18 is a ball valve including a valve element in the form of a ball 18a held by a hat-shaped valve retainer 18b attached to the inner end of the piston block 14, and a hollow cylindrical valve seat member 18c press-fitted in an inner end portion of the axial central hole 14a of the piston block 14. The valve seat member 18c has a valve seat 18d formed at an outer end portion thereof, and the ball 18a is normally urged against the valve seat 18d by the force of a compression coil spring 18e acting between the valve retainer 18b and the ball 18a.

The check valve 18 of the foregoing construction allows the oil to flow from the low-pressure chamber 17 to the high-pressure chamber 16 while blocking flow of the oil in the reversed direction. When the piston 12 moves in the forward direction, the pressure inside the high-pressure chamber 16 decreases. This causes the ball 18a to be disengaged from the valve seat 18d under the pressure of oil flowing from the low-pressure chamber 17, allowing the oil to flow into the high-pressure chamber 16. During the backward stroke of the piston 12, the ball 18a is forced against the valve seat 18d by the force of the spring 18e and under the pressure inside the high-pressure chamber 16.

There is a slight gap or clearance between an outer peripheral surface of the piston block 14 and an inner peripheral surface of the piston bore 11b of the housing 11. This clearance permits only a restricted flow of oil in the direction from the high-pressure chamber 16 to the low-pressure chamber 17. This is because the oil, as it passes through the clearance, encounters a great resistance. With the oil-filled tensioner 10 thus constructed, the piston 12 moves rapidly in the forward (projecting) direction and moves slowly in the backward (retracting) direction.

In order to define an end of the forward stroke of the piston 15, the housing 11 has a stopper such as a C-ring (not shown) provided inside the piston bore 11b.

The ratchet tensioner 30 includes a housing 31 formed integrally with the base 5 of the tensioner lever 4, a plunger 32 slidably received in a plunger bore 31a formed in the housing 31, and a compression coil spring 33 acting between the housing 31 and the plunger 32 to urge the plunger 32 in a direction to project from the housing 31. The plunger 31 has a generally cup-shaped configuration having an open end facing the bottom of the plunger bore. The compression coil spring 33 is disposed in a compressed condition between the bottom of the plunger bore of the housing 31 and the bottom of the cup-shaped plunger 32. The plunger 32 has a row of ratchet teeth 34 formed on an outer peripheral surface of the plunger 32 along an axis thereof, and a ratchet pawl 35 pivotally mounted to the housing 31 and being in mesh with the ratchet teeth 34 to prevent backward (retracting) movement of the plunger 32. Thus, the ratchet teeth 34 and the ratchet pawl 35 jointly form a ratchet mechanism which serves as a stop against backward motion of the plunger 32 while allowing forward motion of the plunger 32. If driven, the ratchet mechanism provides stepwise forward (projecting) motion of the plunger 32.

To form the tensioner device of the present invention, the two tensioners 10, 30 are assembled such that the piston 12 of the oil-filled tensioner 10 and the plunger 32 of the ratchet tensioner 30 are aligned with each other and they are held in abutment with each other under the respective spring forces of the compression coil springs 13 and 33. The spring 13 of the oil-filled tensioner 10 has a spring coefficient greater than that of the spring 33 of the ratchet tensioner 30. With this construction, the tensioner device is able to achieve a long stroke of unitary movement of the piston 12 and plunger 32 which insures proper adjustment of the tension in the chain 3 over a long period of use. To achieve such long stroke, the plunger 32 of the ratchet tensioner 30 is initially disposed in its rearmost or fully retracted position.

The tensioner device of the foregoing construction operates as follows.

In normal conditions, due to the spring coefficient of the spring 13 which is larger than that of the spring 33, the plunger 32 of the ratchet tensioner 30 is urged backward by the force of the spring 13. Accordingly, a ratchet tooth 34 on the plunger 32 is brought into pressure contact with the ratchet pawl 35 on the tensioner lever 4, so that backward movement of the plunger 32 is prevented without producing backlash between the ratchet tooth 34 and the ratchet pawl 35. The oil-filled tensioner 10 applies a tension to the chain 3 via the tensioner lever 4. The piston 12 of the oil-filled tensioner 10 moves forward and backward to adjust the tension in the chain 3 via the tensioner lever 4.

When the chain 3 becomes slack, the piston 12 of the oil-filled tensioner 10 moves forward under the force of the spring 13 to thereby exert a tension on the chain 3 via the tensioner lever 4. In this instance, the plunger 32 of the ratchet tensioner 30 does not work because the spring coefficient of the spring 33 is smaller than that of the spring 13. Thus, the oil-filled tensioner 10 restores a desired chain tension.

When the chain 3 is stretched (i.e., when the tension in the chain 3 increases), the oil-filled tensioner 10 operates to accommodate an increase in the chain tension. The piston 12 of the oil-filled tensioner 10 is restricted in its backward movement but it is not made completely immovable in the backward direction. A sliding fit between the piston 12 and the housing 11 permits of only a restricted flow of oil from the high-pressure chamber 16 to the low-pressure chamber 17 when the oil inside the high-pressure chamber 16 is compressed. Accordingly, when the tensioner lever 4 is forced to turn counterclockwise in FIG. 1 due to an increase in the tension of the chain 3, the piston 12 moves slowly in the backward direction as the oil is gradually forced out from the high-pressure chamber 16 to the low-pressure chamber 17 through a slight clearance between the inner peripheral surface of the piston bore of the housing 11 and the outer peripheral surface of the piston 12. In this instance, since the plunger 32 of the ratchet tensioner 30 is held in abutment with the piston 12 of the oil-filled tensioner 10, the ratchet tensioner 30 does not function as a tensioner. At the very beginning of the backward movement of the tensioner lever 4, the plunger 32 is allowed to move forward within backlash between the ratchet tooth 34 and the ratchet pawl 35 until the piston 12 starts moving backward. During backward movement of the piston 12, no backlash is created between the ratchet teeth 34 and the ratchet pawl 35.

Elongation of the chain 3 occurring due to prolonged use of the chain drive mechanism is inevitable. Such chain elongation can be taken up by the tensioner device of the present invention even when the degree of chain elongation is much larger than that in the conventional chain drive mechanism. The piston 12 of the oil-filled tensioner 10 is effectively operative within a predetermined stroke of linear reciprocating motion. On the other hand, the plunger 32 of the ratchet tensioner 30 can move only in the forward direction. Accordingly, when the chain elongation or sag exceeds the forward stroke of the piston 12, the oil-filled tensioner 10 would become inoperative if not the ratchet tensioner 30. In this instance, the plunger 32 of the ratchet tensioner 30 moves forwards under the bias of the spring 33 thereby to immediately resume abutting engagement with the piston 12 of the oil-filled tensioner 10. A shortage of forward stroke of the piston 12 is thus covered by the forward movement of the plunger 32. Accordingly, the oil-filled tensioner 10 can further continue its operation to take up the chain elongation. When the chain tension increases, the piston 12 of the oil-filled tensioner 10 moves backward to take up an increase in the chain tension. As the chain elongation increases, the foregoing forward movement of the plunger 32 is repeated to cover a shortage of forward stroke of the piston 12. Thus, the tensioner device of the present invention as a while has a long stroke effective for the adjustment of the chain tension.

Figure 2:
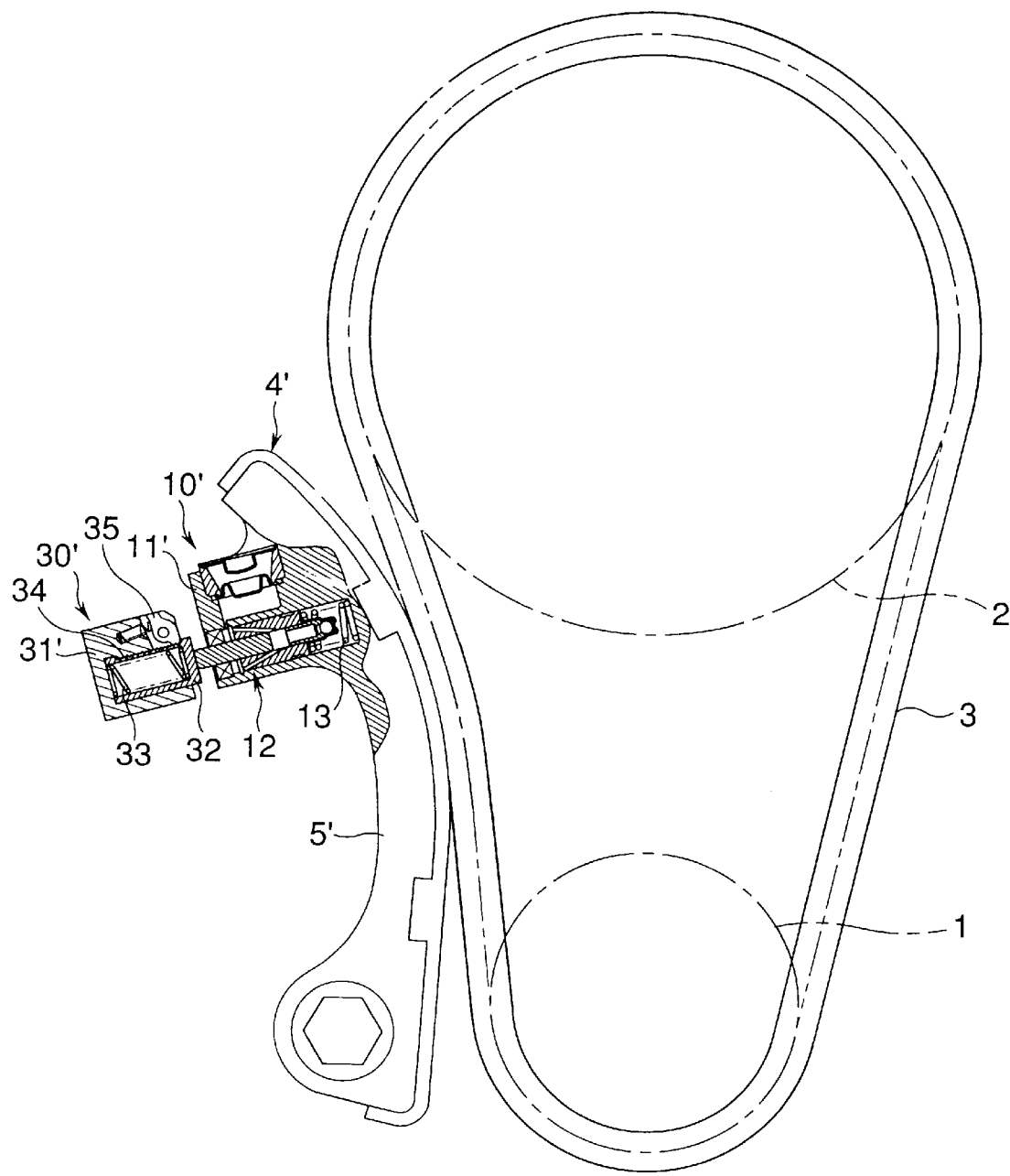
FIG. 2 is a front elevational view, with parts cutaway for clarity, of a tensioner device according to a second embodiment of the resent invention.

FIG. 2 shows a tensioner device according to a second embodiment of the present invention. The tensioner device includes a ratchet tensioner 30' provided on a stationary member such an engine block of a vehicle engine, and an oil-filled tensioner 10' provided on a tensioner lever 4' of the tensioner device. To this end, the ratchet tensioner 30' has a housing 31' attached to the stationary member. The oil-filled tensioner 10' has a housing 11' formed integrally with a metal base 5' of the tensioner lever 4'. In FIG. 2, these parts which are the same as those of the embodiment shown in FIG. 1 are designated by the same reference characters.

The oil-filled tensioner 10' has a piston 12' slidably received in the housing 11', and a compression coil spring 13 received in the housing 11' behind the piston 12 to urge the piston 12 in the forward direction projecting from the housing 11'. The ratchet tensioner 30' has a plunger 32' slidably received in the housing 31', a compression coil spring 33 received in the housing 31' behind the plunger 32' to urge the plunger 32' in the forward direction projecting from the housing 31', and a ratchet pawl 35 mounted to the housing 31' and held in mesh with at least one of plural ratchet teeth 34 on the plunger 32' to prevent backward movement of the plunger 32'. The spring 13 of the oil-filled tensioner 10' has a larger spring coefficient than the spring 33 of the ratchet tensioner 30'. The tensioner device thus constructed has a long stroke which is effective to adjust the tension in the chain even then the chain elongation becomes large due to prolonged use of a chain drive mechanism in which the tensioner device is incorporated. To achieve such long stroke, the plunger 32' of the ratchet tensioner 30' in initially placed in its fully retracted position. Operation of the tensioner device shown in FIG. 2 is the same as the afore-mentioned operation of the tensioner device shown in FIG. 1, and further description thereof can be omitted to avoid duplication.

Figure 3:
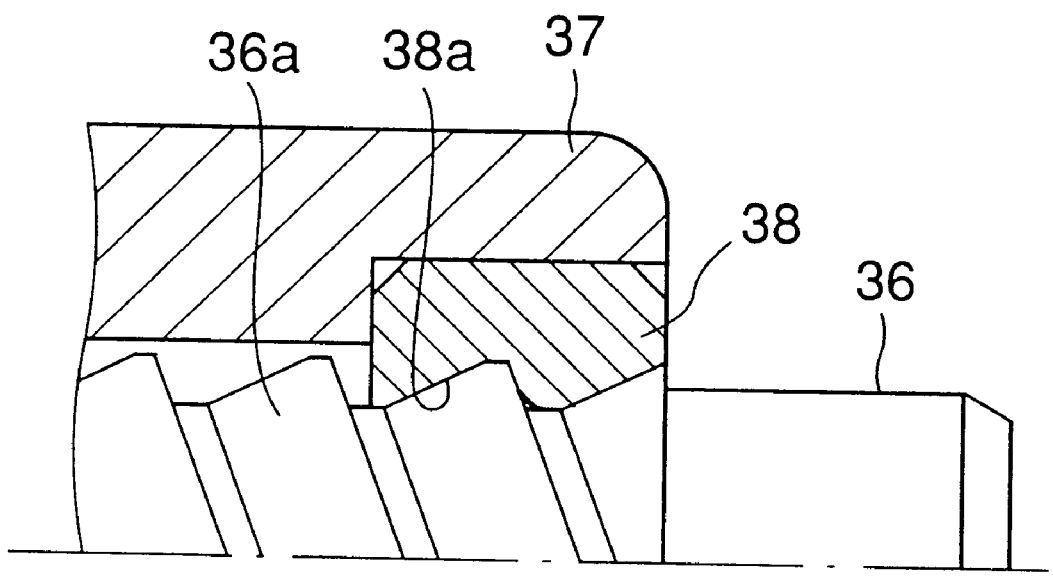
FIG. 3 is an enlarged cross-sectional view showing a modified form of the stop mechanism against backward motion of the plunger of the first tensioner assembly.

In the foregoing embodiments, the rachet pawl 35 used in combination with the ratchet teeth 34 form a stop mechanism against backward motion of the plunger 32, 32' of the ratchet tensioner 30, 30'. The stop mechanism of the ratchet type may be replaced by a screw type stop mechanism such ss shown in FIG. 3. The screw type stop mechanism includes an externally threaded body portion (mail screw) 36a of a plunger 36, and an internally threaded hole (female screw) 38a of a nut member 38 attached to an open end of a housing 37. The male and female screws 36a, 38a have a spiral ridge of sawtooth form in cross section. The sawtooth-like ridge is designed such that the plunger 36 can move forward under the bias of a spring (not shown but identical to the one 33 shown in FIGS. 1 and 3) while rotating about its own axis, but it is prevented from moving in the backward direction.

Figure 4:
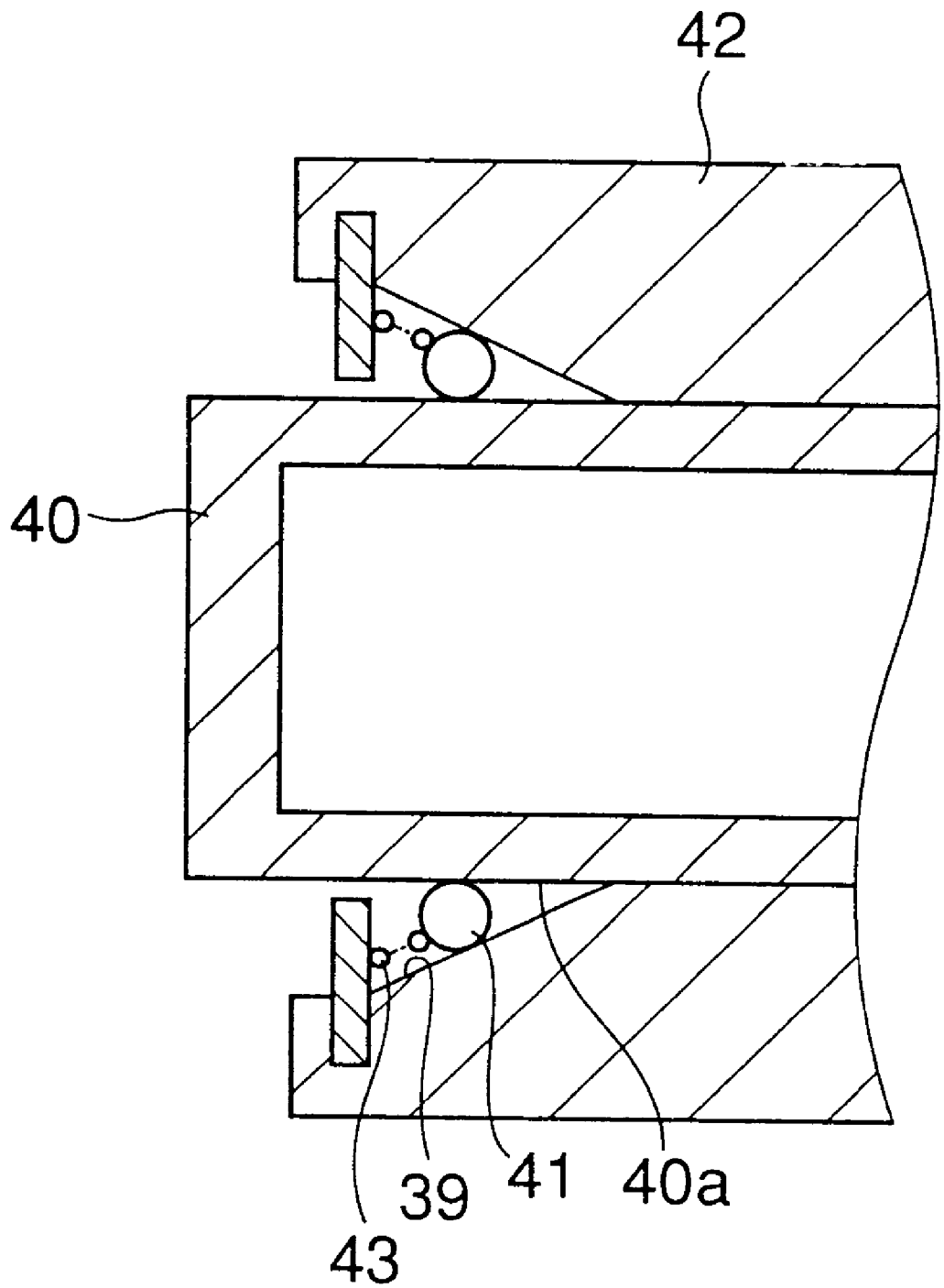
FIG. 4 is an enlarged cross-sectional view showing another modification of the stop mechanism against backward motion of the plunger of the first tensioner assembly.

FIG. 4 shows another modification of the stop mechanism which includes a conical surface 39 formed at an outwardly flared open end of a housing 42, and a plurality of balls 41 urged by a spring 43 in radial inward directions to wedge into an annular space defined between the conical surface 39 and an outer peripheral surface 40a of a plunger 40. The spring-biased balls 41 prevents backward movement of the plunger 40 while allowing forward movement of the plunger 40.

The stop mechanisms of the present invention utilize mechanical arrangements rather than hydraulic arrangements and, hence, they can operate regardless of the presence and magnitude of hydraulic pressure.

As described above, the tensioner device of the present invention includes a first tensioner assembly such as a ratchet tensioner and a second tensioner assembly such as an oil-filled tensioner that are arranged face to face with their actuators (plunger and piston) being in contact with each other. One of the first and second tensioner assemblies is provided on a stationary member such as the cylinder block of a vehicle engine, and the other tensioner assembly is provided on a tensioner lever. The tensioner device thus constructed achieves a long adjustment stroke which insures proper adjustment of the chain even when elongation of the chain becomes large due to prolonged use of a chain drive mechanism.

A conventional attempt made to achieve a long tension adjustment stroke using a single tensioner assembly results in a tensioner device of enlarged size. By contrast, because of the face-to-face abutment of the respective actuators (piston and plunger) of the two tensioner assemblies, the tensioner device of the present invention is relatively small in size.

Additionally, pistons of the oil-filled tensioners generally have a relatively small stroke and becomes inworkable when the chain sag exceeds the piston stroke. However, according to the invention, the ratchet tensioner used in combination with the oil-filled tensioner operates to cover a shortage of forward stroke of the piston, thereby making the piston of the oil-filled tensioner workable. Thus, the chain tension can be properly and continuously adjusted over a long period of use of the chain drive mechanism.

Obviously, various changes and modifications of the invention are possible in the light of the above teaching. It is to be understood that within the scope of the appended claims the present invention may be practiced otherwise than as specifically described.

What is claimed is:

1. A tensioner device for a chain drive mechanism including at least two sprockets spaced from each other on a stationary member, and an endless chain wound around the sprockets, said tensioner device comprising:

a tensioner lever having one end pivoted to the stationary member, said tensioner lever being in slide contact with the chain between the sprockets to adjust a tension in the chain;

a first tensioner assembly including a first housing, a plunger movable in a forward direction relative to said first housing, a spring urging said plunger toward the forward direction, and a stop means for preventing backward movement of said plunger;

a second tensioner assembly including a second housing, a piston movable in a forward and a backward direction relative to said second housing, a spring urging said piston toward the forward direction, and means for restricting backward movement of said piston while allowing forward movement of said piston;

one of said first and second tensioner assemblies being provided on said tensioner lever, and the other tensioner assembly being provided on the stationary member;

said plunger and said piston being in face-to-face abutment with each other; and said spring of said first tensioner assembly having a spring coefficient smaller than a spring coefficient of the spring of said second tensioner assembly.

2. A tensioner device according to claim 1, wherein one of said first and second housings is integral with said tensioner lever, and the other housing is attached to the stationary member.

3. A tensioner device according to claim 1, wherein said stop means is a ratchet mechanism including a row of ratchet teeth formed on an outer peripheral surface of said plunger along an axis of said plunger, and a ratchet pawl pivotally mounted to said first housing and held in mesh with one of said ratchet teeth to prevent backward movement of said plunger while allowing forward movement of said plunger.

4. A tensioner device according to claim 1, wherein said stop means is a screw stop mechanism including an externally threaded body portion of said plunger, and a nut member attached to an open end of said first housing and having an internally threaded hole in which said externally threaded body portion is threaded, said externally threaded body portion and said internally threaded hole having threads of sawtooth form, said sawtooth form threads being so designed as to prevent backward movement of said plunger while allowing forward movement of the plunger.

5. A tensioner device according to claim 1, wherein said stop means includes a conical surface formed at an open end of said first housing, and a plurality of spring-biased balls urged to wedge into an annular space defined between said conical surface and an outer peripheral surface of said plunger so as to prevent backward movement of said plunger while allowing forward movement of said plunger.

* * * * *